United States Patent
Tanaka et al.

(10) Patent No.: US 12,012,788 B2
(45) Date of Patent: Jun. 18, 2024

(54) WORK VEHICLE

(71) Applicant: KUBOTA CORPORATION, Osaka (JP)

(72) Inventors: Ryosuke Tanaka, Sakai (JP); Mami Fujii, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 381 days.

(21) Appl. No.: 17/355,278

(22) Filed: Jun. 23, 2021

(65) Prior Publication Data

US 2021/0404225 A1 Dec. 30, 2021

(30) Foreign Application Priority Data

Jun. 25, 2020 (JP) ................. 2020-109569

(51) Int. Cl.
| | |
|---|---|
| E05B 83/24 | (2014.01) |
| B62D 25/12 | (2006.01) |
| E05C 3/30 | (2006.01) |

(52) U.S. Cl.
CPC ............ *E05B 83/243* (2013.01); *B62D 25/12* (2013.01); *E05C 3/30* (2013.01)

(58) Field of Classification Search
CPC ........ E05B 15/04; E05B 83/243; E05B 83/24; B62D 25/12; B62D 49/00; E05C 3/30
See application file for complete search history.

(56) References Cited

U.S. PATENT DOCUMENTS

| | | | | |
|---|---|---|---|---|
| 2,793,061 A | * | 5/1957 | Dall | ........................ E05B 83/24 292/6 |
| 2013/0193697 A1 | * | 8/2013 | Spadoni | .................. E05B 83/36 292/336.3 |

FOREIGN PATENT DOCUMENTS

| | | | | |
|---|---|---|---|---|
| CN | 102862532 A | * | 1/2013 | ............ B60R 19/18 |
| DE | 100 19 587 A1 | | 10/2001 | |
| DE | 10019587 A1 | * | 10/2001 | ............ E05B 77/04 |
| DE | 10 2007 038 951 A1 | | 2/2009 | |
| DE | 102007038951 A1 | * | 2/2009 | ............ E05B 83/24 |
| EP | 3470309 A1 | * | 4/2019 | ............ B62D 25/12 |
| EP | 3 495 249 A1 | | 6/2019 | |
| EP | 3575190 A1 | * | 12/2019 | ............ B62D 25/12 |
| JP | H05171849 A | * | 7/1993 | |
| JP | 05-80973 U | | 11/1993 | |
| JP | 06-035557 U | | 5/1994 | |
| JP | 08-48264 A | | 2/1996 | |
| JP | 09-273340 A | | 10/1997 | |
| JP | 09273340 A | * | 10/1997 | |
| JP | H09273340 A | * | 10/1997 | |
| JP | 2009-203729 A | | 9/2009 | |
| JP | 2009203729 A | * | 9/2009 | |

(Continued)

OTHER PUBLICATIONS

Official Communication issued in corresponding European Patent Application No. 21181525.3, mailed on Nov. 26, 2021.

*Primary Examiner* — James A Shriver, II
*Assistant Examiner* — Michael T. Walsh
(74) *Attorney, Agent, or Firm* — Keating & Bennett, LLP

(57) ABSTRACT

A work vehicle includes an openable and closable bonnet that covers an engine and is rockable with respect to a body frame, a pin that is provided on the body frame side, and a lock that is provided on the bonnet side and is switchable between a locked state in which the bonnet is locked by the lock engaging with the pin and an unlocked state in which the bonnet is not locked by the lock not engaging with the pin.

10 Claims, 18 Drawing Sheets

(56) References Cited

FOREIGN PATENT DOCUMENTS

| JP | 2013-515887 | A |   | 5/2013  |             |
|----|-------------|---|---|---------|-------------|
| JP | 2013-139229 | A |   | 7/2013  |             |
| JP | 2017087919  | A | * | 5/2017  | ........... B60Q 1/0433 |
| JP | 2019-098928 | A |   | 6/2019  |             |
| JP | 2019098928  | A | * | 6/2019  |             |
| KR | 20010055756 | A | * | 7/2001  |             |
| KR | 101459937   | B1| * | 11/2014 |             |
| NP | H0635557    | U | * | 5/1994  |             |
| WO | WO-0236457  | A1| * | 5/2002  | ........... B65D 83/202 |

* cited by examiner

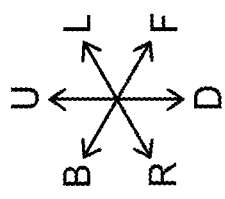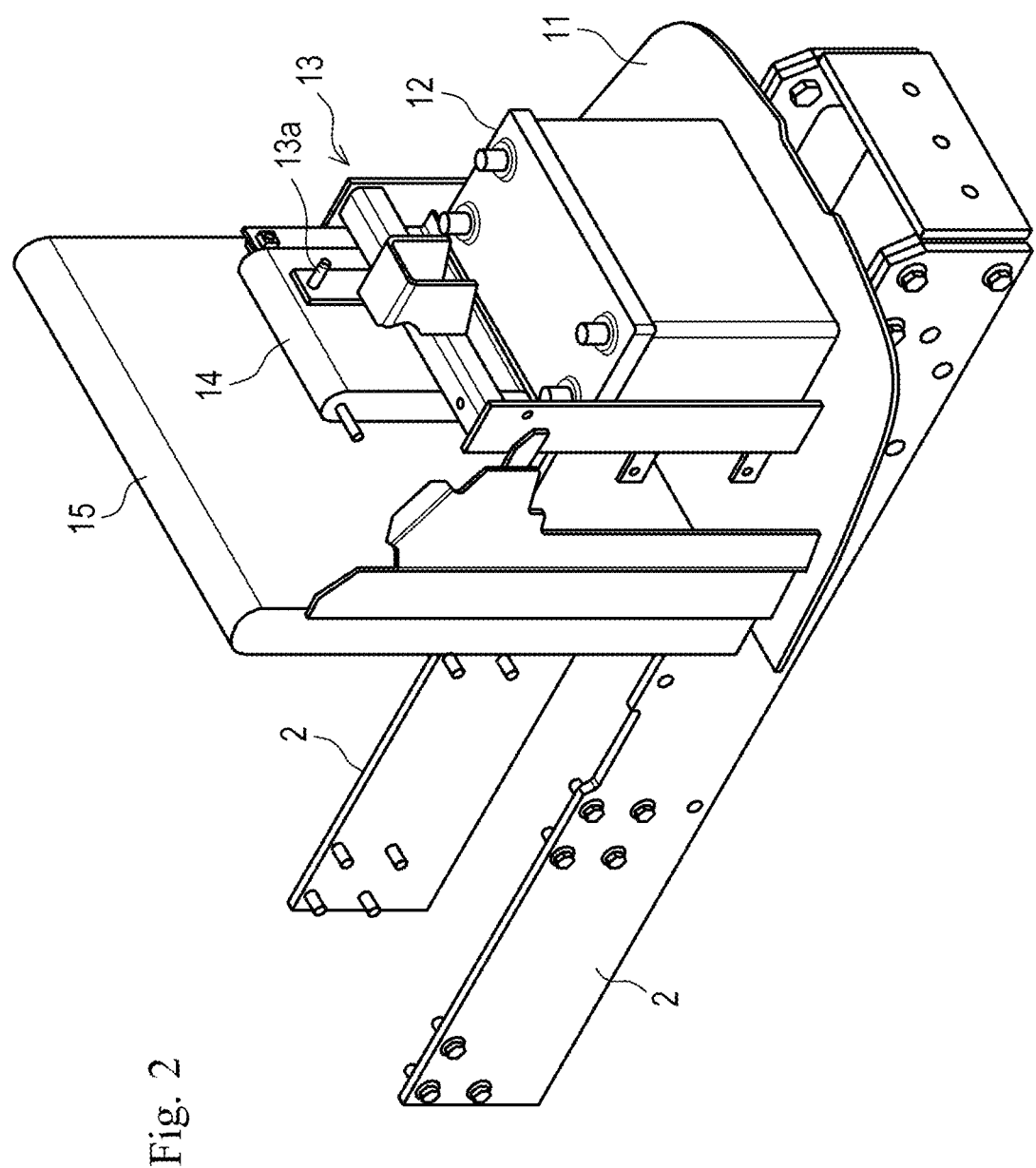
Fig. 2

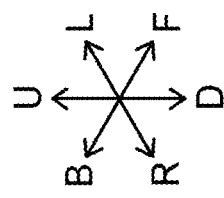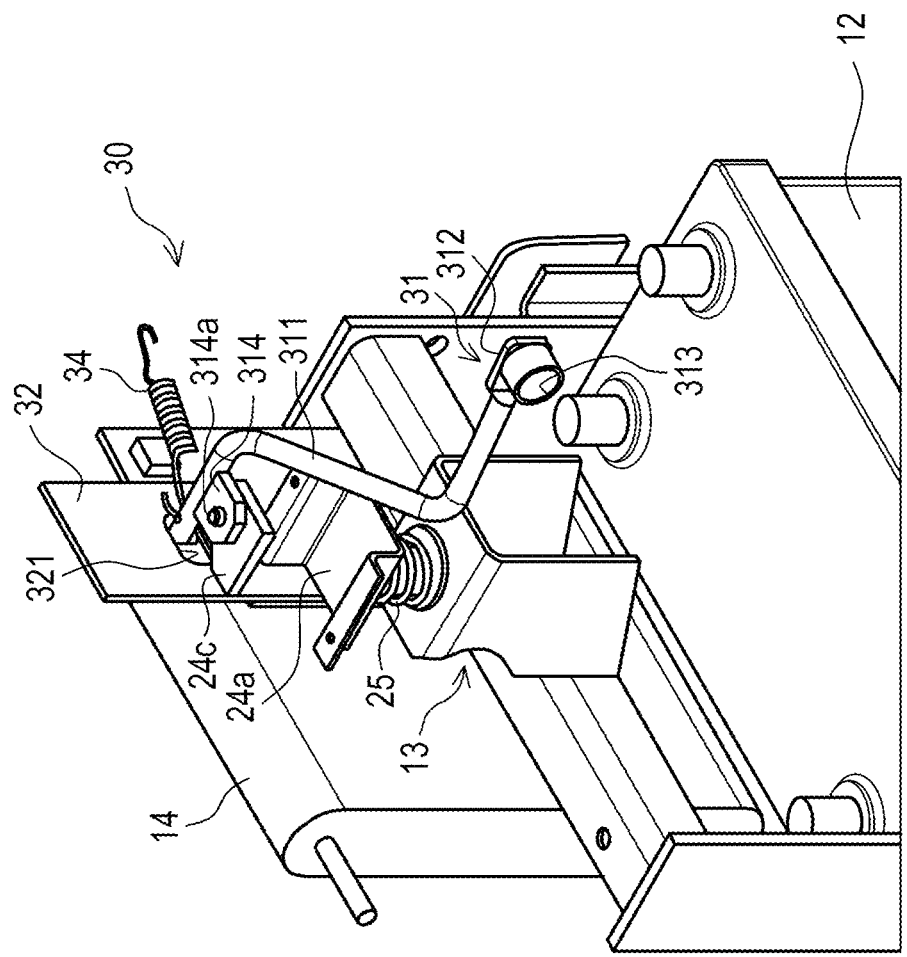
Fig. 6

Fig. 7
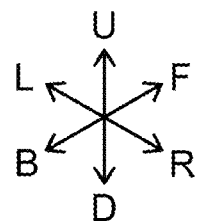
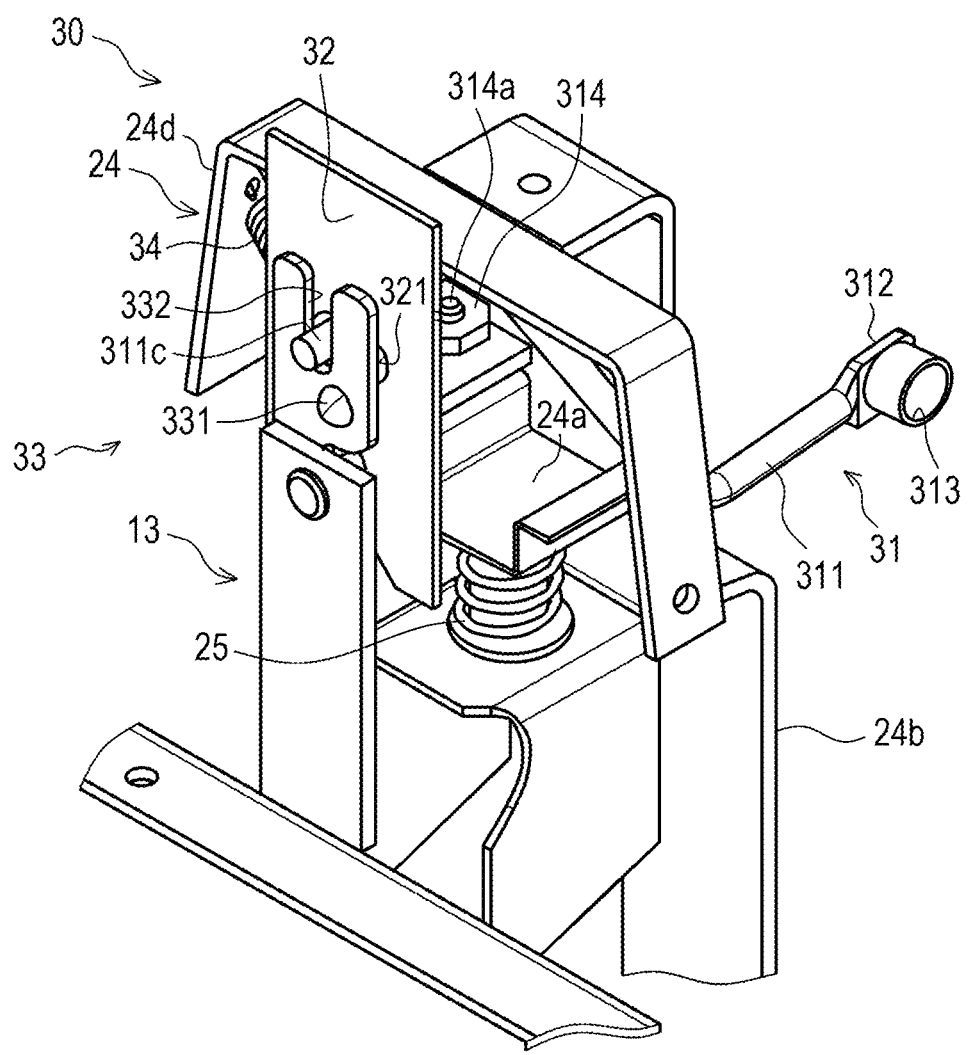

Fig. 11
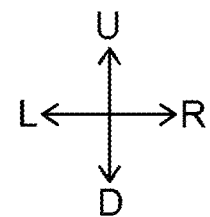
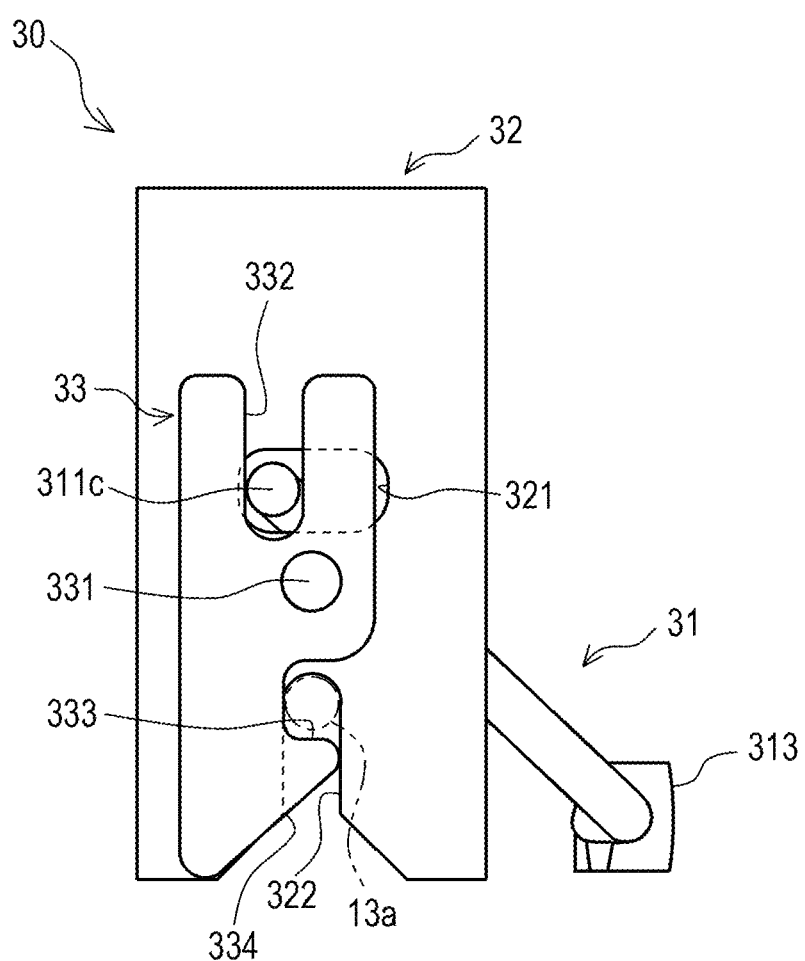

Fig. 12A
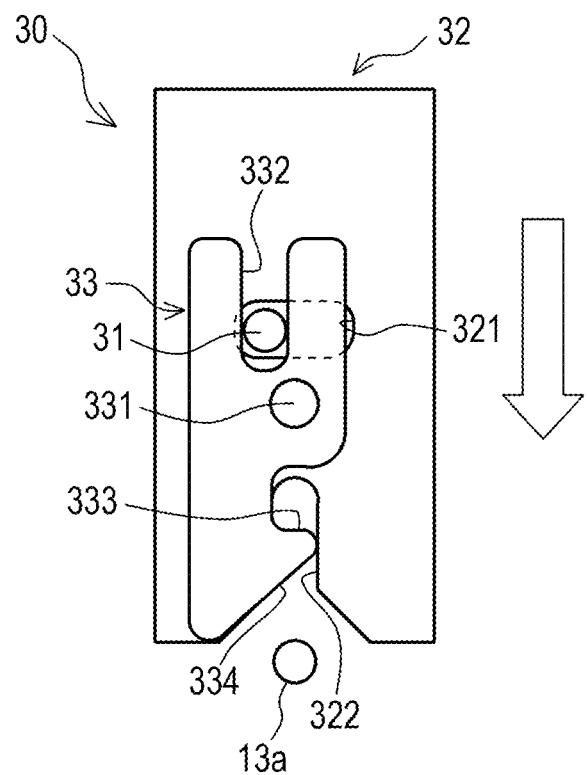
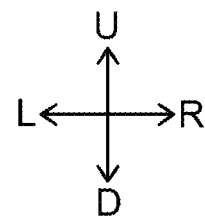
Fig. 12B
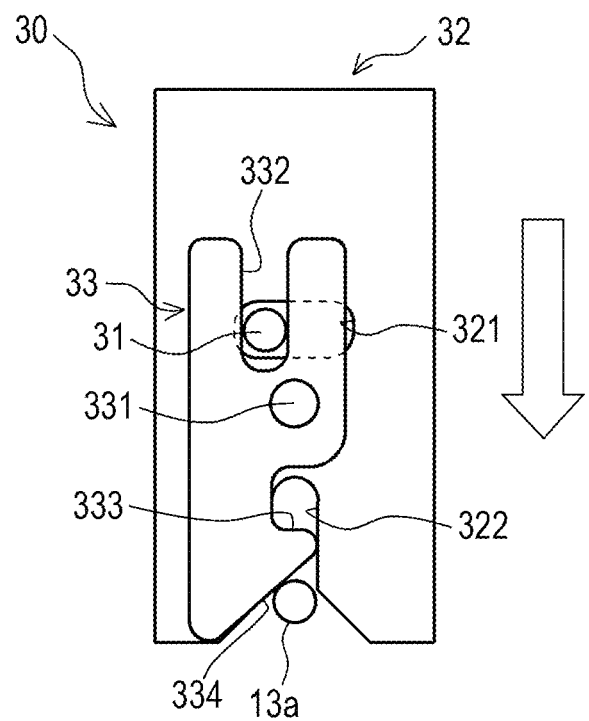
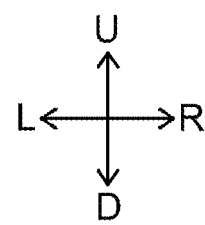

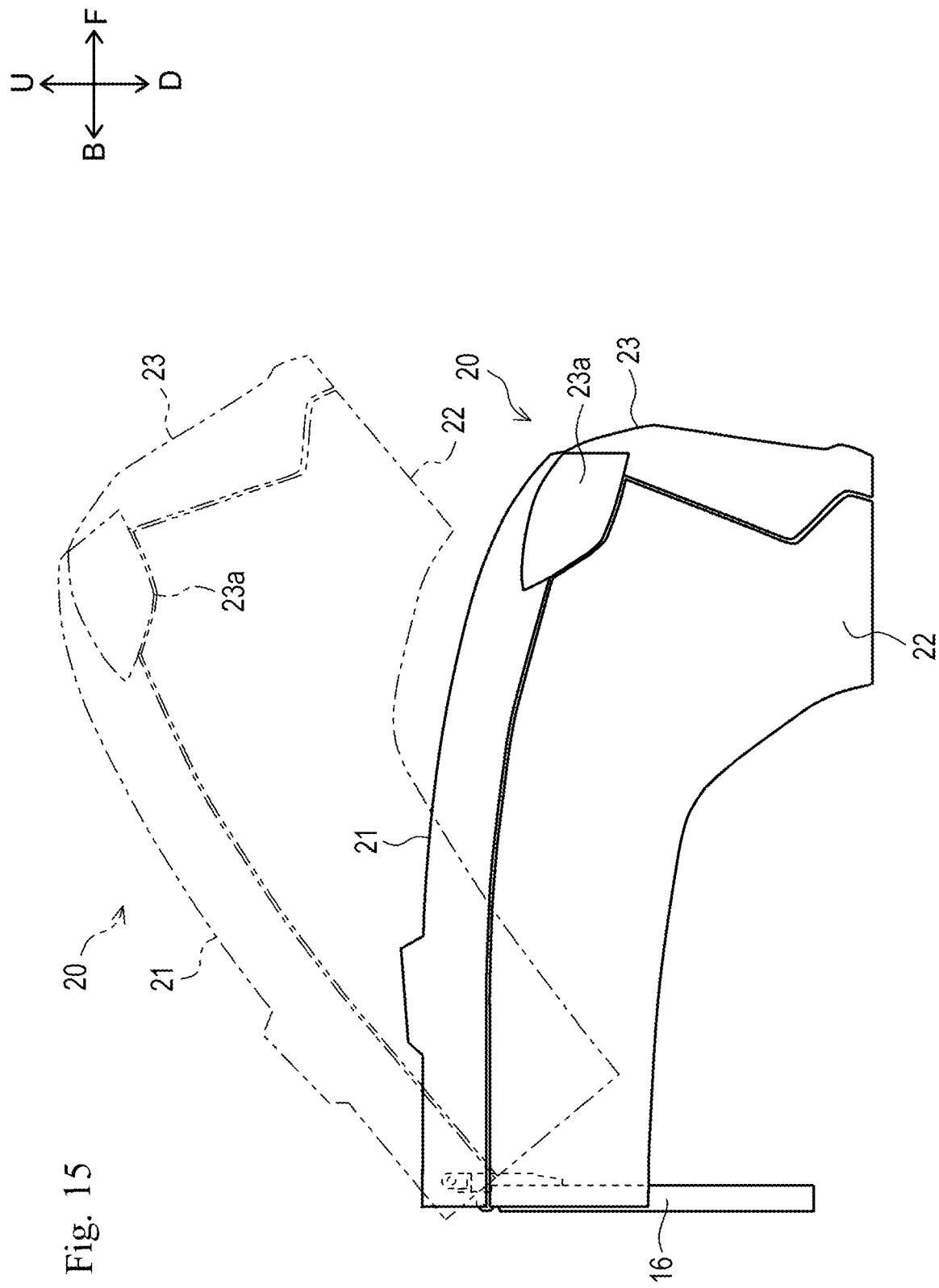

WORK VEHICLE

CROSS REFERENCE TO RELATED APPLICATIONS

This application claims the benefit of priority to Japanese Patent Application No. 2020-109569 filed on Jun. 25, 2020. The entire contents of this application are hereby incorporated herein by reference.

BACKGROUND OF THE INVENTION

1. Field of the Invention

The present disclosure relates to a technique for a work vehicle in which a bonnet can be locked.

2. Description of the Related Art

Conventionally, the technique for a work vehicle in which a bonnet can be locked has been known. For example, such a technique is described in JP 2019-98928 A.

JP 2019-98928 A discloses an agricultural tractor including an openable and closable bonnet that covers an engine room, a pin member provided on the inner wall of the bonnet, and a lock mechanism (bonnet fixture) that engages with the pin member to lock the bonnet. In the agricultural tractor, the lock mechanism is provided in the engine room.

However, in the technique described in JP 2019-98928 A, since the lock mechanism is provided on the engine room side, there is a possibility that a sufficient work space, visibility, etc. cannot be secured, and therefore there is room for improvement in terms of workability.

SUMMARY OF THE INVENTION

Preferred embodiments of the present invention provide work vehicles each capable of improving workability.

That is, in a work vehicle according to a preferred embodiment of the present invention, an openable and closable bonnet that covers an engine and is rockable with respect to a body frame, an engaged portion on a body frame side, and a lock on a bonnet side and switchable between a locked state in which the bonnet is locked by the lock engaging with the engaged portion and an unlocked state in which the bonnet is not locked by the lock not engaging with the engaged portion are included.

In a work vehicle according to a preferred embodiment of the present invention, the lock includes a moving member that can move by being pressed by an operating tool, a lock portion that engages with the engaged portion, and is disengaged from the engaged portion as the moving member moves.

In a work vehicle according to a preferred embodiment of the present invention, the moving member includes a pressed portion pressed by the operating tool, and a contact portion that comes into contact with the lock portion, and the moving member rocks around a rocking shaft by the pressed portion being pressed by the operating tool, and presses the lock portion by the contact portion, and the lock portion is movable, and a distance between the rocking shaft and the contact portion is shorter than a distance between the rocking shaft and the pressed portion when viewed from an axial direction of the rocking shaft.

In a work vehicle according to a preferred embodiment of the present invention, the pressed portion, the rocking shaft, and the contact portion are positioned in this order substantially in a front-rear direction.

In a work vehicle according to a preferred embodiment of the present invention, the lock is provided in a front portion of the bonnet, and the moving member is provided forward of the lock portion.

In a work vehicle according to a preferred embodiment of the present invention, the moving member is bent so as not to interfere with a frame provided on an inner surface of the bonnet.

In a work vehicle according to a preferred embodiment of the present invention, the moving member includes a guide portion that guides the operating tool to press the moving member.

In a work vehicle according to a preferred embodiment of the present invention, the bonnet includes a through hole that is visible from a front of a vehicle body and into which the operating tool can be inserted.

In a work vehicle according to a preferred embodiment of the present invention, the lock is located between left and right headlights.

Preferred embodiments of the present disclosure exhibit one or more of the following effects.

In a work vehicle according to a preferred embodiment of the present invention, workability is improved.

In a work vehicle according to a preferred embodiment of the present invention, the lock has a simple configuration.

In a work vehicle according to a preferred embodiment of the present invention, a force required to operate the moving member is reduced, and thus the workability of unlocking is improved.

In a work vehicle according to a preferred embodiment of the present invention, the moving member can be disposed by effectively utilizing a limited space in the bonnet.

In a work vehicle according to a preferred embodiment of the present invention, by consolidating the lock in the front portion of the bonnet, it is possible to prevent the moving member and other members inside the bonnet from interfering with each other.

In a work vehicle according to a preferred embodiment of the present invention, the moving member can be disposed without expanding a space for disposing the moving member.

In a work vehicle according to a preferred embodiment of the present invention, the moving member is easily pressed by the operating tool, and thus the workability of unlocking is improved.

In a work vehicle according to a preferred embodiment of the present invention, the through hole into which the operating tool is inserted can be easily visually recognized.

In a work vehicle according to a preferred embodiment of the present invention, the lock can be disposed by effectively utilizing a space between the left and right headlights.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a front perspective view showing a body frame and members supported by the body frame.

FIG. 3 is a front perspective view showing a bonnet and the like.

FIG. 6 is a front perspective view showing a lock mechanism and the like.

FIG. 7 is a rear perspective view showing the lock mechanism and the like.

FIG. 8 is a rear disassembled perspective view showing the lock mechanism and the like.

FIG. 9 is a right side view showing the lock mechanism and the like.

FIG. 10 is a plan view showing the lock mechanism and the like.

FIG. 11 is a rear view showing the lock mechanism.

FIG. 12A is a rear view showing the lock mechanism when the bonnet is open.

FIG. 12B is a rear view showing the lock mechanism when the bonnet is being closed (first stage).

FIG. 15 is a side view showing the bonnet closed and open.

DETAILED DESCRIPTION OF THE PREFERRED EMBODIMENTS

Figure 1:
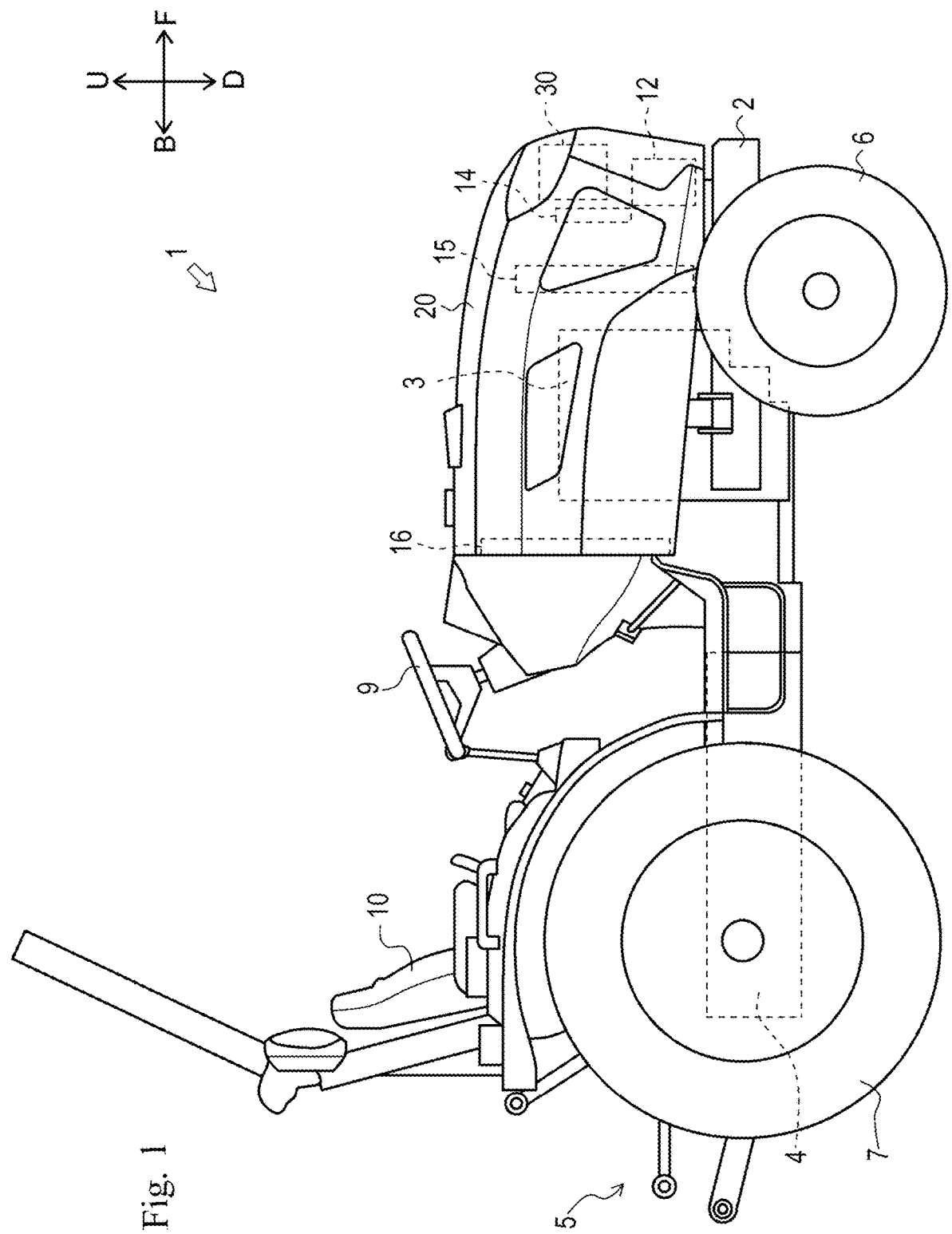
FIG. 1 is a right side view showing an overall configuration of a tractor according to a preferred embodiment of the present invention.

In the following, the directions indicated by arrows U, D, F, B, L, and R in the figure are defined as upward, downward, forward, backward, leftward, and rightward, respectively.

Hereinafter, an overall configuration of a tractor 1 according to a preferred embodiment of the present disclosure will be described with reference to FIGS. 1 and 2.

The tractor 1 mainly includes a body frame 2, an engine 3, a transmission case 4, a hydraulic lifting device 5, front wheels 6, rear wheels 7, a bonnet 20, a steering wheel 9, a seat 10, a base member 11, a battery 12, a support frame 13, a fuel cooler 14, a radiator 15, a center pillar 16, a lock mechanism 30, and the like.

The body frame 2 is disposed with a longitudinal direction of the body frame 2 oriented in a front-rear direction. The engine 3 is fixed to a rear portion of the body frame 2. The transmission case 4 is disposed behind the engine 3. The hydraulic lifting device 5 is provided in a rear portion of the transmission case 4. Various work devices (for example, a rotary tillage device, etc.) can be mounted on the hydraulic lifting device 5. Further, various work machines (for example, mowers) can be mounted on a lower portion of the transmission case 4 (between the front wheels 6 and the rear wheels 7).

Further, a front portion of the body frame 2 is supported by a pair of the left and right front wheels 6 through a front axle mechanism (not shown). The transmission case 4 is supported by a pair of the left and right rear wheels 7 through a rear axle mechanism (not shown).

The engine 3 is covered with the bonnet 20 supported by the center pillar 16. Behind the bonnet 20, the steering wheel 9 to adjust a turning angle of the front wheels 6 is provided. Behind the steering wheel 9, the seat 10 is provided for a driver to sit on.

After a speed change by a transmission (not shown) accommodated in the transmission case 4, power of the engine 3 can be transmitted to the front wheels 6 through the front axle mechanism, and can be transmitted to the rear wheels 7 through the rear axle mechanism. In this way, the front wheels 6 and the rear wheels 7 are rotationally driven by the power of the engine 3, and the tractor 1 can travel.

The lock mechanism 30 to lock the bonnet 20 (holding the bonnet 20 while the bonnet 20 is closed) is provided in a front portion inside the bonnet 20.

As shown in FIG. 2, the base member 11 is located on a front portion of the body frame 2 (forward of the engine 3 shown in FIG. 1), and the battery 12 is located on the base member 11. Further, the support frame 13 including appropriate panel members is provided on the base member 11, and the fuel cooler 14 and the like are supported by the support frame 13. The radiator 15 is provided behind the fuel cooler 14. Further, the support frame 13 includes a pin 13a extending forward from the support frame 13. The pin 13a is provided above the battery 12 and forward of the fuel cooler 14 and the radiator 15. The pin 13a locks the bonnet 20 by engaging with the lock mechanism 30.

Figure 3:
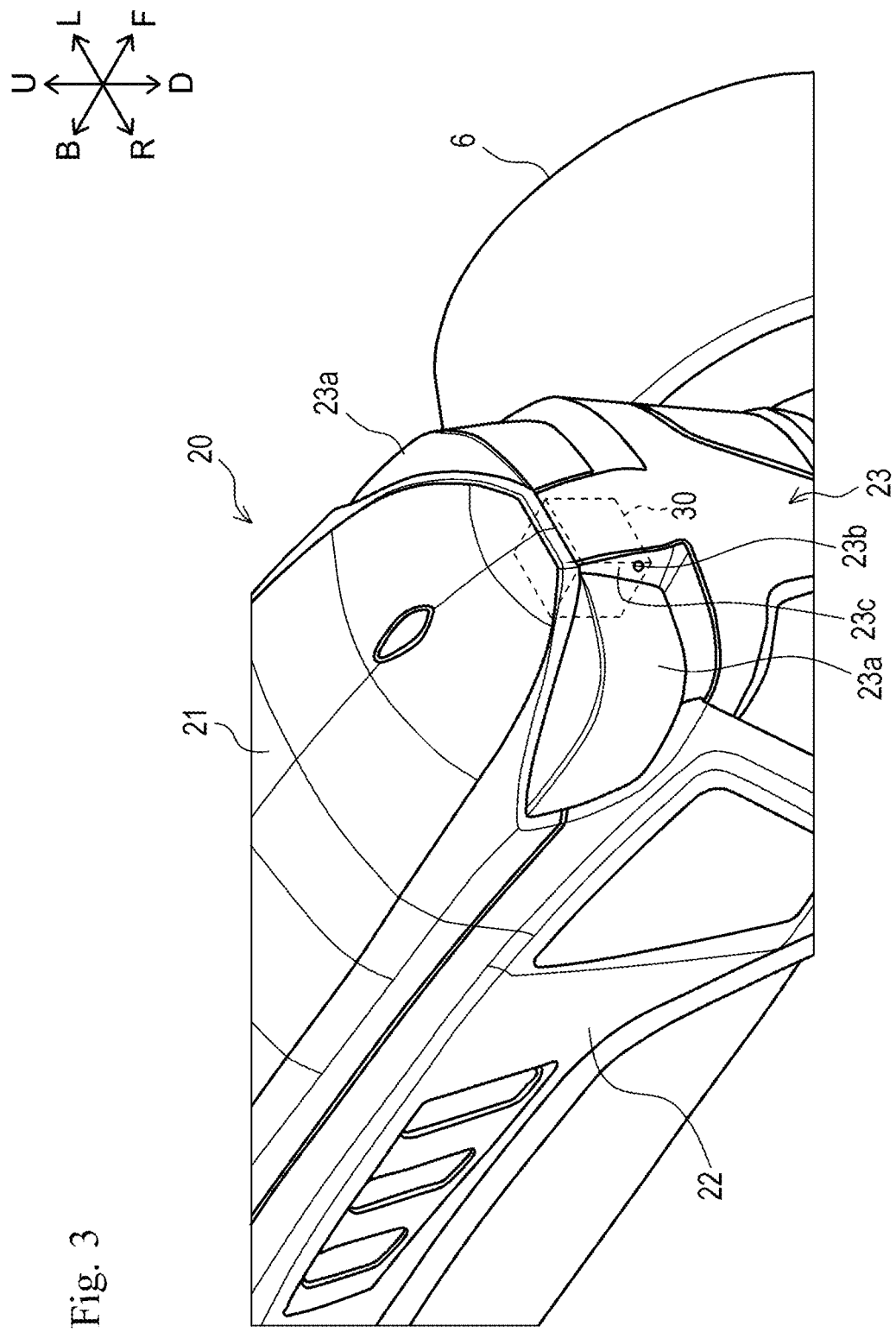
Figure 4:
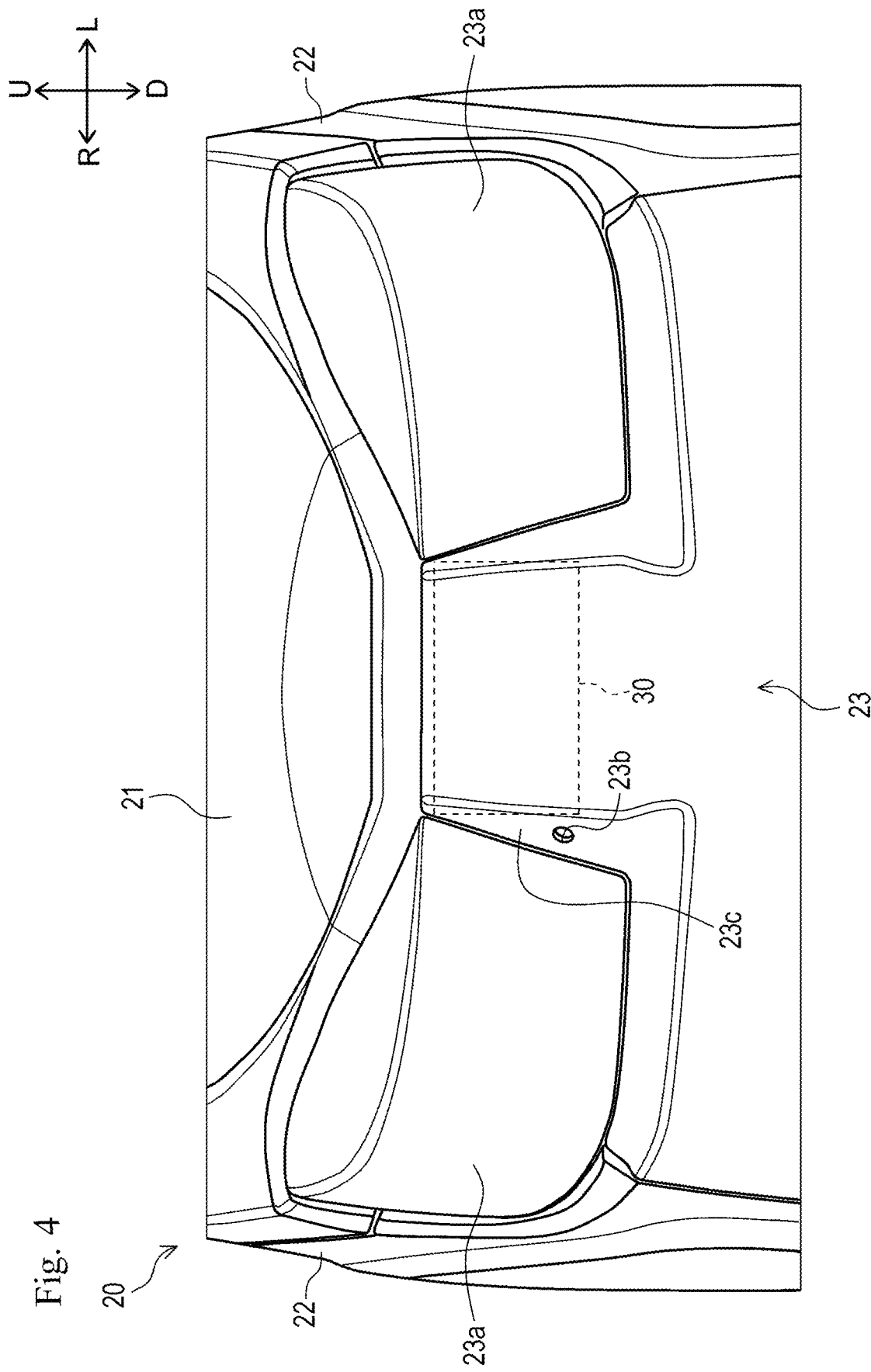
FIG. 4 is a front view showing the bonnet.
Figure 5:
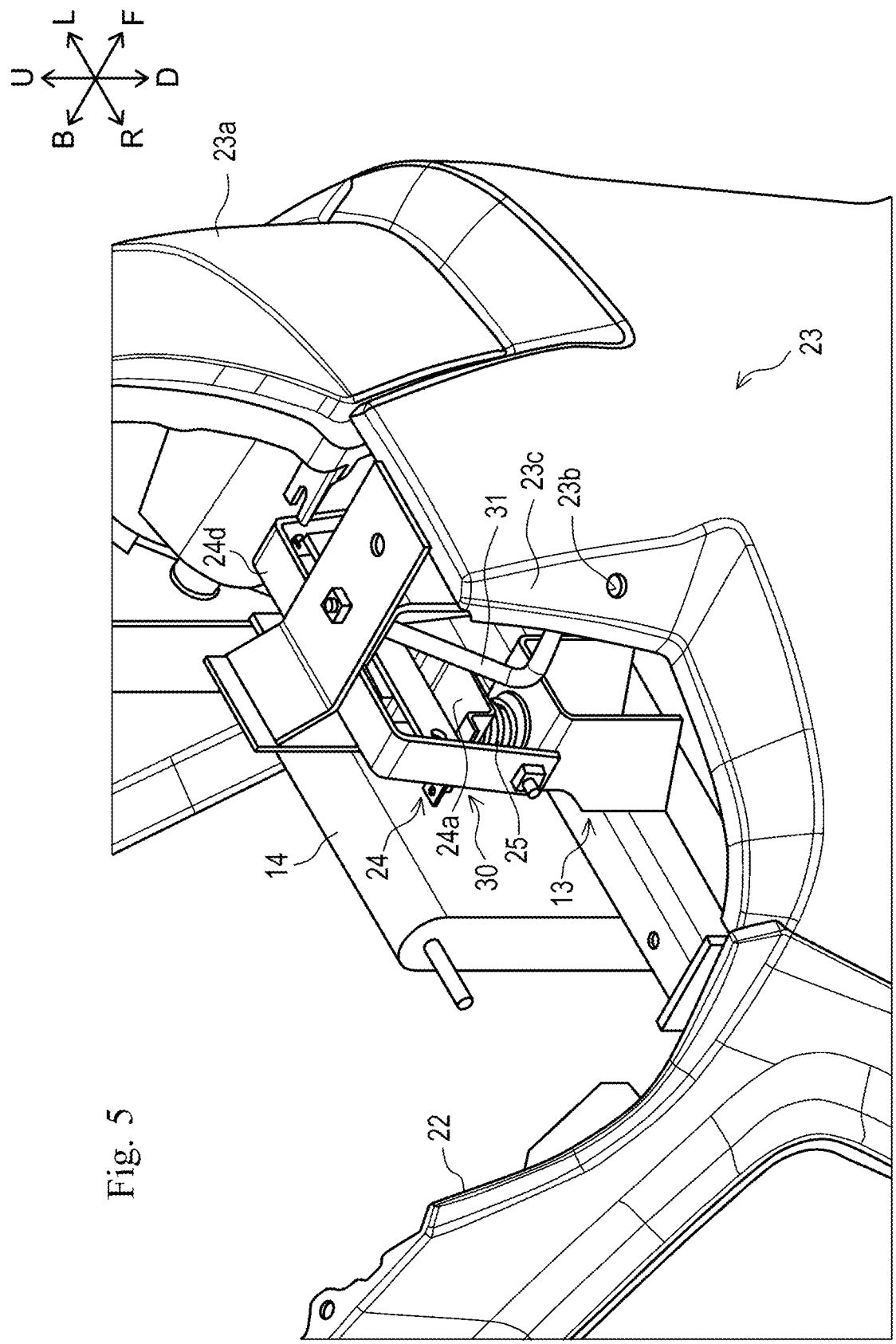
FIG. 5 is a front perspective view showing the bonnet and an inside of the bonnet.

Hereinafter, a structure of the bonnet 20 will be described with reference to FIGS. 3 to 5 and 10. Note that FIGS. 3 to 5 show a state in which the bonnet 20 is closed. Further, in FIG. 5, in order to show the inside of the bonnet 20, illustrations of a bonnet upper portion 21 and a headlight 23a on a right side are omitted.

The bonnet 20 is positioned to cover the engine 3 shown in FIG. 1 and the battery 12 and the like (the base member 11, the battery 12, the support frame 13, the fuel cooler 14, and the radiator 15) shown in FIG. 2. A rear end portion of the bonnet 20 is rotatably supported with respect to the center pillar 16 (see FIGS. 1 and 15). As a result, the bonnet 20 is provided with a front end portion rockable up and down with respect to the body frame 2 (through the center pillar 16). The bonnet 20 mainly includes the bonnet upper portion 21, bonnet side portions 22, a bonnet front portion 23, a bonnet frame 24, and an urging member 25.

The bonnet upper portion 21 is an upper portion of the bonnet 20. The bonnet upper portion 21 is provided so as to cover the engine 3, the battery 12, and the like from above.

The bonnet side portions 22 include left and right side portions of the bonnet 20. The bonnet side portions 22 are provided so as to cover the engine 3, the battery 12, and the like from sides.

The bonnet front portion 23 is a front portion of the bonnet 20. The bonnet front portion 23 is provided so as to cover the engine 3, the battery 12, and the like from the front. The headlights 23a are provided on left and right sides of the bonnet front portion 23. Further, a through hole 23b is provided in the bonnet front portion 23.

An operating tool A (see FIGS. 16A and 16B) is inserted into the through hole 23b to unlock the bonnet 20. The through hole 23b penetrates a portion (a surface 23c facing a front right direction) slightly on a right side of a center between the left and right sides of the bonnet front portion 23 (see FIGS. 5 and 10). The through hole 23b is visible in a front view.

The bonnet frame 24 shown in FIG. 5 reinforces the bonnet 20. The bonnet frame 24 includes appropriate panel members (a first member 24a, a second member 24b, a third member 24c, a fourth member 24d, etc. shown in FIGS. 6 to 9 and the like). The bonnet frame 24 is provided on an inner wall side of the bonnet 20. The bonnet frame 24 is fixed to each of the bonnet upper portion 21, the bonnet side portions 22, and the bonnet front portion 23, and connects the bonnet upper portion 21, the bonnet side portions 22, and the bonnet front portion 23.

The urging member 25 shown in FIG. 5 assists opening and closing of the bonnet 20. The urging member 25 urges the bonnet frame 24 upward, and is, for example, a compression coil spring. The urging member 25 is attached to a lower surface of the first member 24a of the bonnet frame 24. The urging member 25 is provided in a compressed state between the first member 24a and the support frame 13 located below the first member 24a.

The bonnet 20 configured in this way rotates so that the front portion moves upward to open and close the inside (engine room) of the bonnet 20.

The bonnet 20 is locked through engagement of the lock mechanism 30 (a lock member 33 of the lock mechanism 30) with the pin 13a provided on the body frame 2 side (more specifically, the support frame 13 attached to the body frame 2). The lock mechanism 30 is provided on the bonnet 20 side. That is, the lock mechanism 30 is provided so as to move together with the bonnet 20 as the bonnet 20 moves (rocks).

Hereinafter, a configuration of the lock mechanism 30 will be described with reference to FIGS. 5 to 11.

The lock mechanism 30 locks the bonnet 20 by engaging with the pin 13a. Further, the lock mechanism 30 is configured to be movable by a user of the tractor 1 operating the operating tool A (for example, a screw driver or the like, see FIGS. 16A and 16B), and the bonnet 20 can be unlocked. As described above, the lock mechanism 30 is provided on the front portion of the inside of the bonnet 20 (see FIGS. 1 and 5). In addition, the lock mechanism 30 is provided so that a major portion of the lock mechanism 30 is located in a space between the left and right headlights 23a (see FIGS. 3 and 4 and the like). The lock mechanism 30 includes a moving member 31, a regulating portion 32, a lock member 33, and an urging member 34.

The moving member 31 is movable. The moving member 31 is provided above the battery 12 and forward of the fuel cooler 14 and the radiator 15 (see FIG. 6). The moving member 31 is provided to the left of the through hole 23b (see FIG. 10). The moving member 31 includes a rod portion 311, a pressed portion 312, a guide portion 313, and a supported portion 314.

The rod portion 311 defines a main structural body of the moving member 31. The rod portion 311 includes a rod front portion 311a, a rod middle portion 311b, and a rod rear portion 311c.

The rod front portion 311a defines a front portion of the rod portion 311. The rod front portion 311a is provided with a stretching direction oriented substantially in the front-rear direction.

The rod middle portion 311b defines a middle portion of the rod portion 311. The rod middle portion 311b extends substantially to the upper left from a rear end portion of the rod front portion 311a.

The rod rear portion 311c defines a rear portion of the rod portion 311. The rod rear portion 311c extends substantially rearward from an upper end portion (left end portion) of the rod middle portion 311b.

Figure 8:
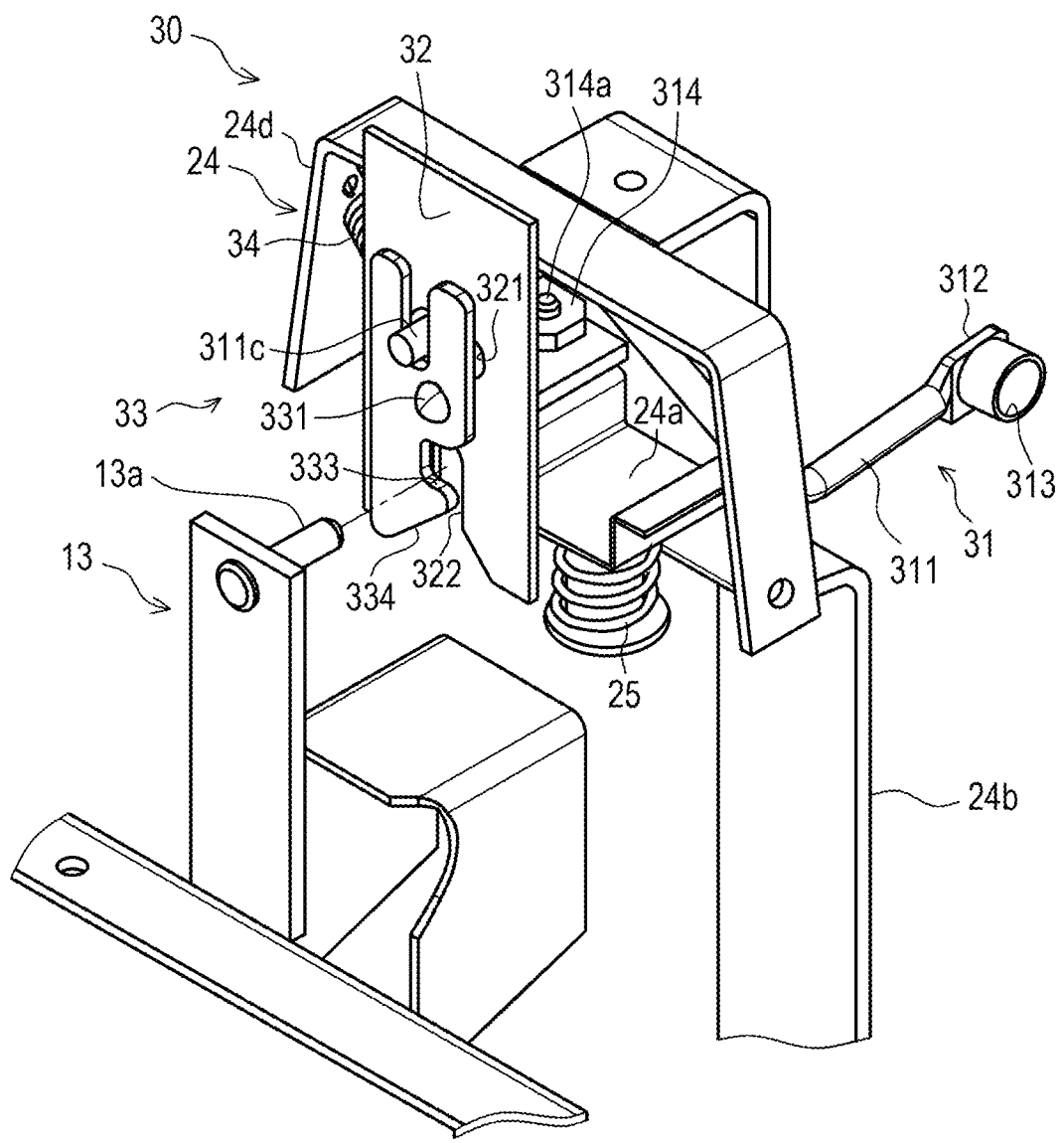
Figure 9:
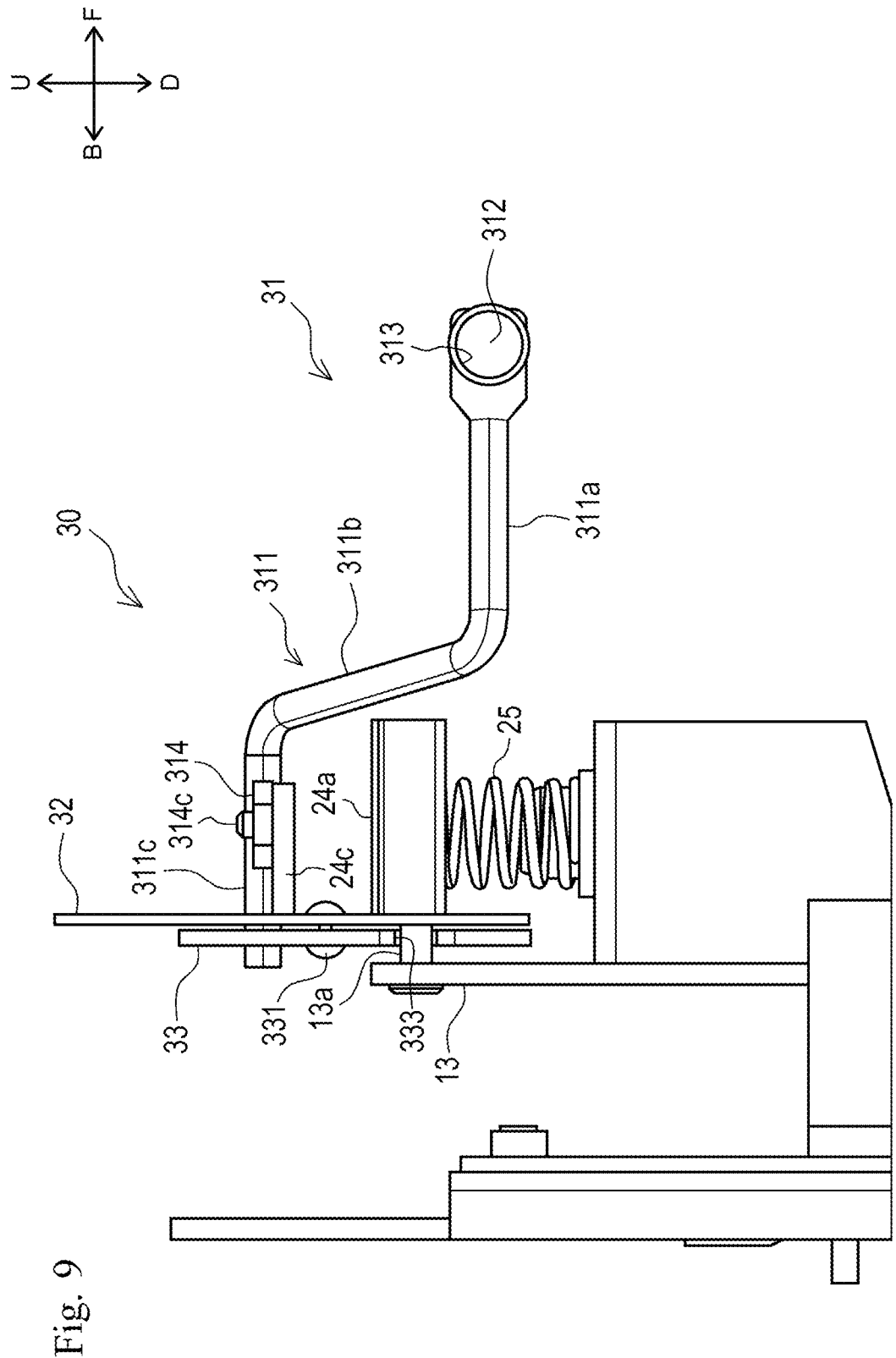

By being bent in this way, the rod portion 311 does not interfere with a member inside the bonnet 20 (for example, the second member 24b located forward of the lock mechanism 30 and extending substantially in a vertical direction, see FIGS. 7 and 8).

The pressed portion 312 is pressed by the operating tool A. The pressed portion 312 is provided in a front end portion of the rod front portion 311a. The pressed portion 312 is provided on a left rear side of the through hole 23b (see FIG. 10). The pressed portion 312 preferably has a plate shape with a plate surface oriented substantially in a left-right direction.

The guide portion 313 guides the operating tool A so that the pressed portion 312 can be pressed by the operating tool A. The guide portion 313 preferably has a cylindrical shape with the axis oriented substantially in the left-right direction. The guide portion 313 is fixed to a surface of the pressed portion 312 facing a right side.

The supported portion 314 is supported by the bonnet frame 24. The supported portion 314 extends to the right from the rod rear portion 311c. The supported portion 314 preferably has a plate shape with a plate surface facing in the vertical direction. A rocking shaft 314a is inserted through the supported portion 314.

The rocking shaft 314a defines a rocking center of the moving member 31. The rocking shaft 314a is inserted into a through hole provided in a central or substantially central portion of the supported portion 314 in a front view with the axis oriented in the vertical direction. Further, the rocking shaft 314a is fixed to the third member 24c provided above the first member 24a of the bonnet frame 24 (see FIGS. 6 and 9). The rocking shaft 314a is provided behind and to the left of the pressed portion 312 (see FIG. 10).

The moving member 31 configured in this way is supported rotatably around the axis of the rocking shaft 314a (around the rocking shaft 314a) with respective to the bonnet frame 24 (the third member 24c).

The regulating portion 32 preferably has a plate shape with a plate surface facing in the front-rear direction. The regulating portion 32 preferably has a substantially rectangular shape in a front view with the longitudinal direction oriented in the vertical direction. The regulating portion 32 is provided behind the rocking shaft 314a of the moving member 31. A long hole 321 and a first cut-away portion 322 are provided in the regulating portion 32.

The long hole 321 shown in FIGS. 6 and 11 and the like regulates movement of the moving member 31. The long hole 321 is located above a rocking shaft 331, which will be described later, with the longitudinal direction oriented in the left-right direction. The rod rear portion 311c of the moving member 31 is inserted into the long hole 321. As a result, a rocking range of the moving member 31 is regulated.

The first cut-away portion 322 shown in FIGS. 8 and 11, and the like is a cut-away portion below the long hole 321. The first cut-away portion 322 is positioned so that a center of a lower end of the regulating portion 32 is cut away upward. A lower portion of the first cut-away portion 322 is structured so that the lateral width increases downward. The pin 13a is inserted into the first cut-away portion 322 (see FIG. 8).

The lock member 33 engages with the pin 13a. The lock member 33 preferably has a plate shape with a plate surface facing in the front-rear direction. The lock member 33 is provided with the longitudinal direction oriented in the vertical direction. The lock member 33 is provided behind the regulating portion 32. The lock member 33 includes the rocking shaft 331, a second cut-away portion 332, a third cut-away portion 333, and a slope portion 334.

The rocking shaft 331 defines the rocking center of the lock member 33. The rocking shaft 331 is inserted into a through hole provided at substantially the center between the upper and lower sides of the lock member 33 and slightly to the right of the center between the left and right sides of the lock member 33 with the axis oriented in the front-rear direction. Further, the rocking shaft 331 is also inserted into the regulating portion 32 and is provided so as not to fall out from the regulating portion 32 and the lock member 33.

The second cut-away portion 332 shown in FIGS. 7, 8 and 11 and the like engages with the moving member 31. The second cut-away portion 332 is above the rocking shaft 331. The second cut-away portion 332 is positioned so that the center of an upper end of the lock member 33 is cut away downward. The second cut-away portion 332 is perpendicular or substantially perpendicular to the long hole 321 in a rear view. The rod rear portion 311c of the moving member 31 is inserted through the second cut-away portion 332. In the following, a portion of the rod rear portion 311c located in the second cut-away portion 332 (portion capable of contacting the second cut-away portion 332) is referred to as a contact portion 311d (see FIG. 10). The contact portion 311d is provided substantially rearward (left rear) of the rocking shaft 314a.

The pressed portion 312, the rocking shaft 314a, and the contact portion 311d are positioned in this order in the substantially front-rear direction in order from the front side. Further, in a plan view (viewed from an axial direction of the rocking shaft 314a), the pressed portion 312, the rocking shaft 314a, and the contact portion 311d are positioned so that a linear distance between the center of the rocking shaft 314a and the contact portion 311d is shorter than a linear distance between the center of the rocking shaft 314a and the pressed portion 312.

The third cut-away portion 333 shown in FIGS. 8 and 11 and the like engages with the pin 13a. The third cut-away portion 333 is below the rocking shaft 331. The third cut-away portion 333 is structured so that a right end portion of the lock member 33 is cut away to the left. The third cut-away portion 333 is below a lower end of the second cut-away portion 332. The third cut-away portion 333 is structured so that a portion of the third cut-away portion 333 overlaps with the first cut-away portion 322 in a rear view. The pin 13a is inserted into the third cut-away portion 333 (see FIG. 8).

The slope portion 334 shown in FIGS. 8 and 11 is a lower surface of the lock member 33. The slope portion 334 preferably has a shape of a right upward slope.

The urging member 34 urges the moving member 31, and is, for example, a tension coil spring. One end of the urging member 34 is fixed to the rod rear portion 311c of the moving member 31. Another end of the urging member 34 is fixed to the fourth member 24d (see FIGS. 7 and 8) of the bonnet frame 24 at a left front of the one end of the urging member 34. As a result, the urging member 34 urges the rod rear portion 311c to the left front.

In the lock mechanism 30 configured in this way, the third cut-away portion 333 of the lock member 33 engages with the pin 13a of the support frame 13, and more specifically, a lower end portion of the third cut-away portion 333 of the lock member 33 comes into contact with the pin 13a of the support frame 13 from below so as to lock the bonnet 20 in a closed position.

Hereinafter, an operation of the lock mechanism 30 to lock the bonnet 20 while the bonnet 20 is closed will be described with reference to FIGS. 12A to 15. In FIGS. 12A and 18B, which will be described later, a vertical distance between the pin 13a and the lock mechanism 30 is shown shorter than the actual distance.

FIG. 12A shows the lock mechanism 30 while the bonnet 20 is open (the state shown by alternate long and short dash lines in FIG. 15). At this time, the lock mechanism 30 is located above the pin 13a and is not engaged with the pin 13a. That is, the lock mechanism 30 is in an unlocked state in which the bonnet 20 is not locked. When the user rotates the bonnet 20 so that the front portion moves downward, the lock mechanism 30 moves downward and approaches the pin 13a.

As shown in FIG. 12B, when the lock mechanism 30 moves further downward, the slope portion 334 of the lock member 33 comes into contact with the pin 13a from above.

Figure 13A:
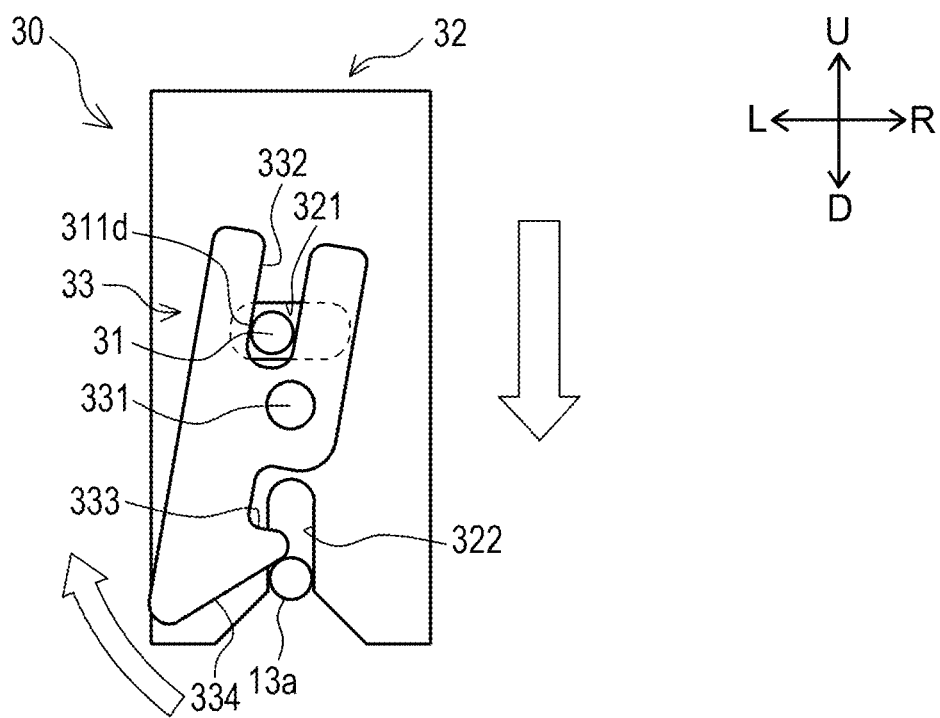
FIG. 13A is a rear view showing the lock mechanism when the bonnet is being closed (second stage).

As shown in FIG. 13A, when the lock mechanism 30 moves further downward, the lock member 33 is pressed upward by the pin 13a. Then, the lock member 33 rotates clockwise in a rear view around the axis of the rocking shaft 331. When the lock member 33 rotates, the second cut-away portion 332 presses the contact portion 311d of the moving member 31 to the right. Then, the moving member 31 rotates counterclockwise in a plan view around the axis of the rocking shaft 314a against urging force of the urging member 34 (see FIG. 10).

Figure 13B:
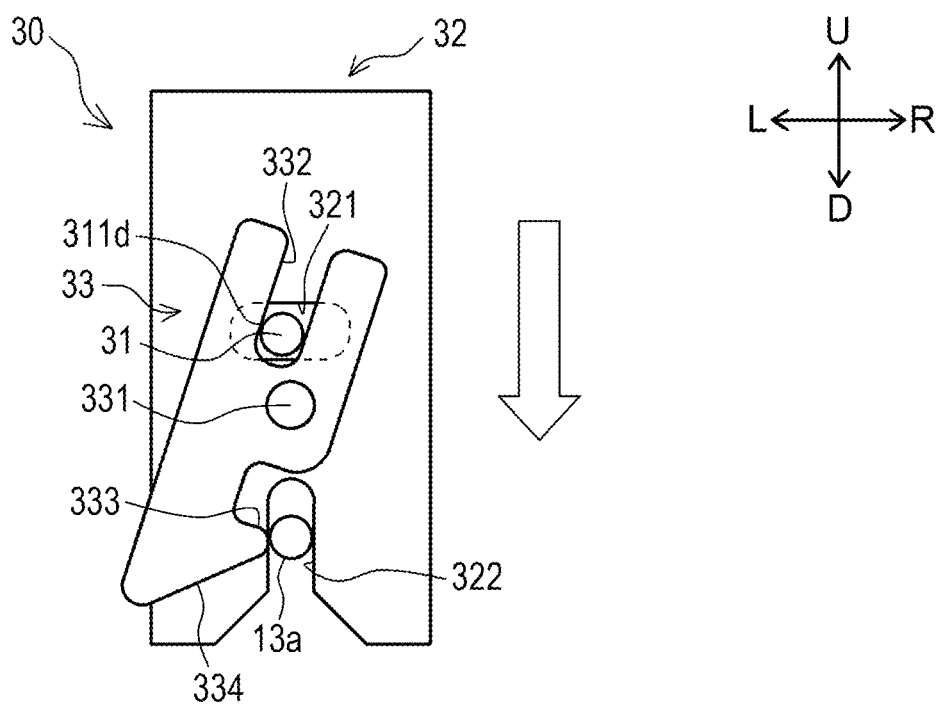
FIG. 13B is a rear view showing the lock mechanism when the bonnet is being closed (third stage).

As shown in FIG. 13B, when the lock member 33 further rotates with the movement of the lock mechanism 30, the slope portion 334 does not come into contact with the pin 13a.

Figure 10:
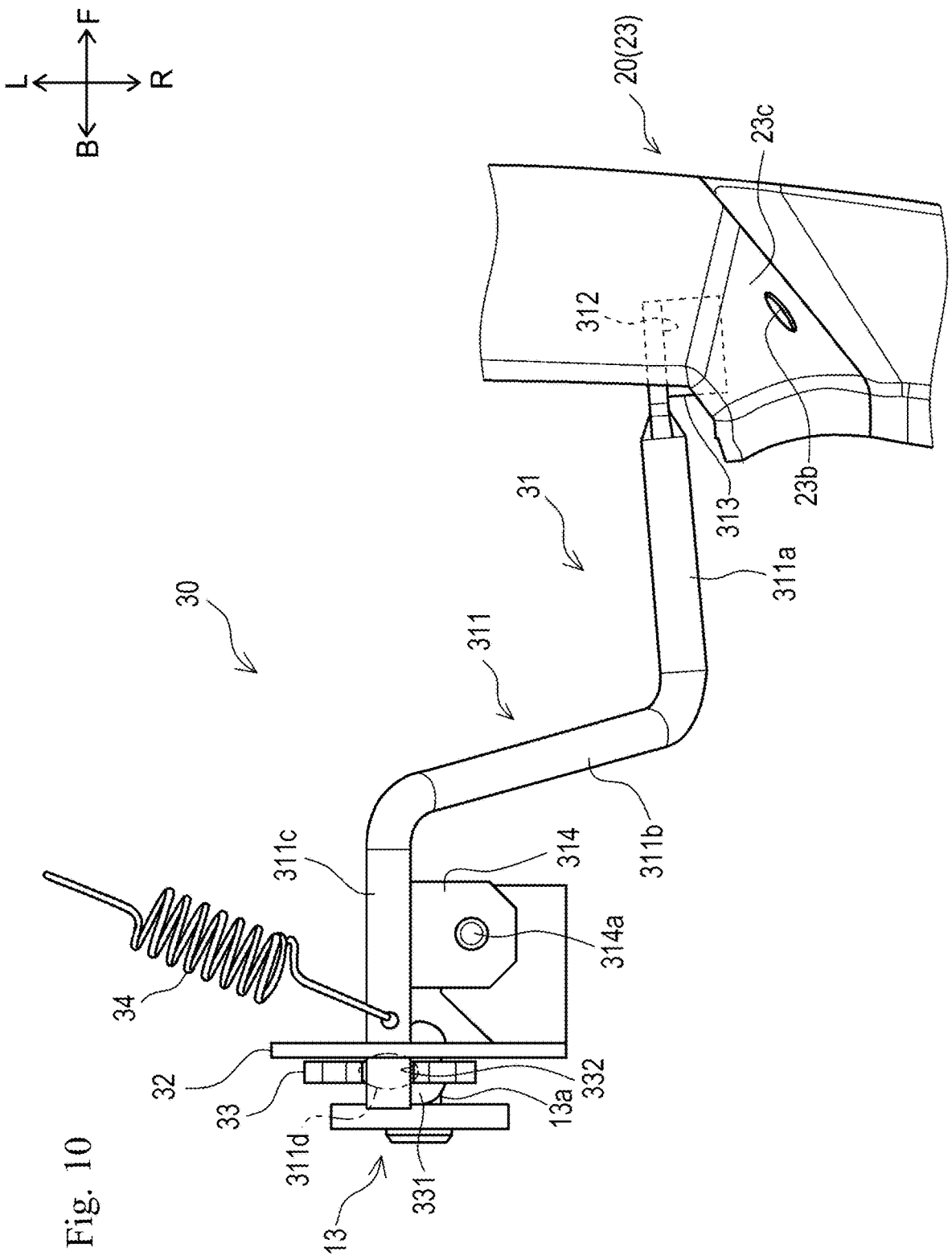

Then, the moving member 31 rotates clockwise in a plan view around the axis of the rocking shaft 314a due to the urging force of the urging member 34 (see FIG. 10). Then, the contact portion 311d of the moving member 31 presses the second cut-away portion 332 of the lock member 33 to the left, so that the lock member 33 rotates counterclockwise in a rear view.

Figure 14:
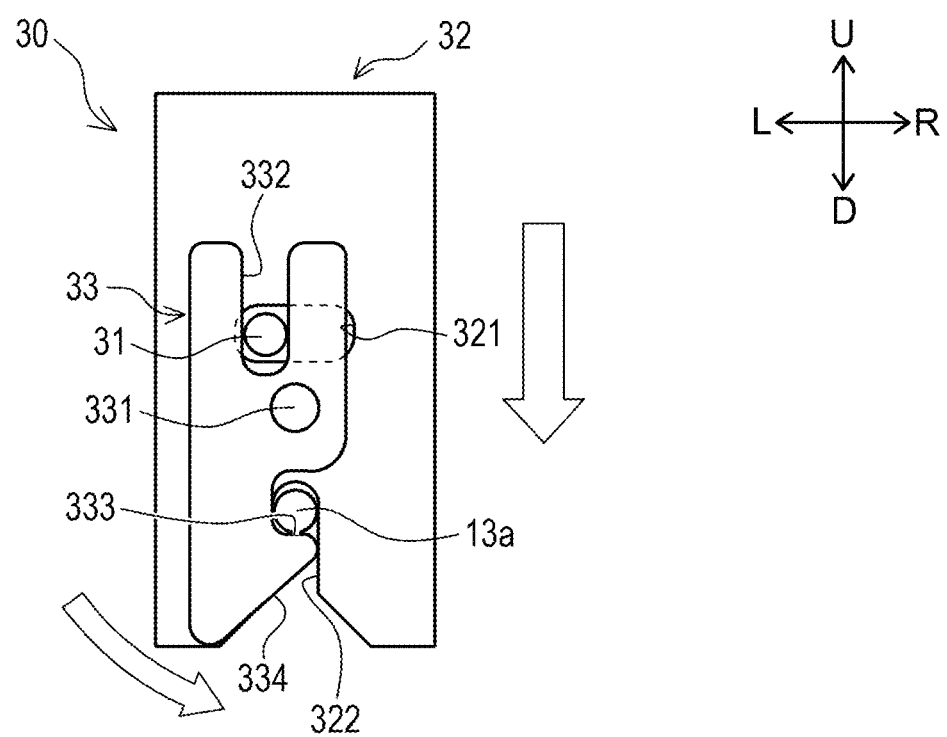
FIG. 14 is a rear view showing the lock mechanism when the bonnet is closed.

As shown in FIG. 14, the lock member 33 rotates counterclockwise in a rear view while the lock mechanism 30 moves downward, so that the pin 13a is fitted into the third cut-away portion 333. Although the bonnet 20 (the bonnet frame 24 of the bonnet 20) is urged upward by the urging member 25 (see FIG. 9 etc.), the lower surface of the third cut-away portion 333 comes into contact with the pin 13a from below. Therefore, upward movement of the bonnet 20 is regulated. As a result, the lock mechanism 30 is in a locked state in which the bonnet 20 is locked. In this way, the bonnet 20 is locked while being closed (at the position shown by the solid lines in FIG. 15).

Hereinafter, an operation of the lock mechanism 30 to unlock the bonnet 20 will be described with reference to FIGS. 15 to 18. In addition, in FIGS. 16A to 18B, members (the regulating portion 32, etc.) are omitted as appropriate.

Figure 16A:
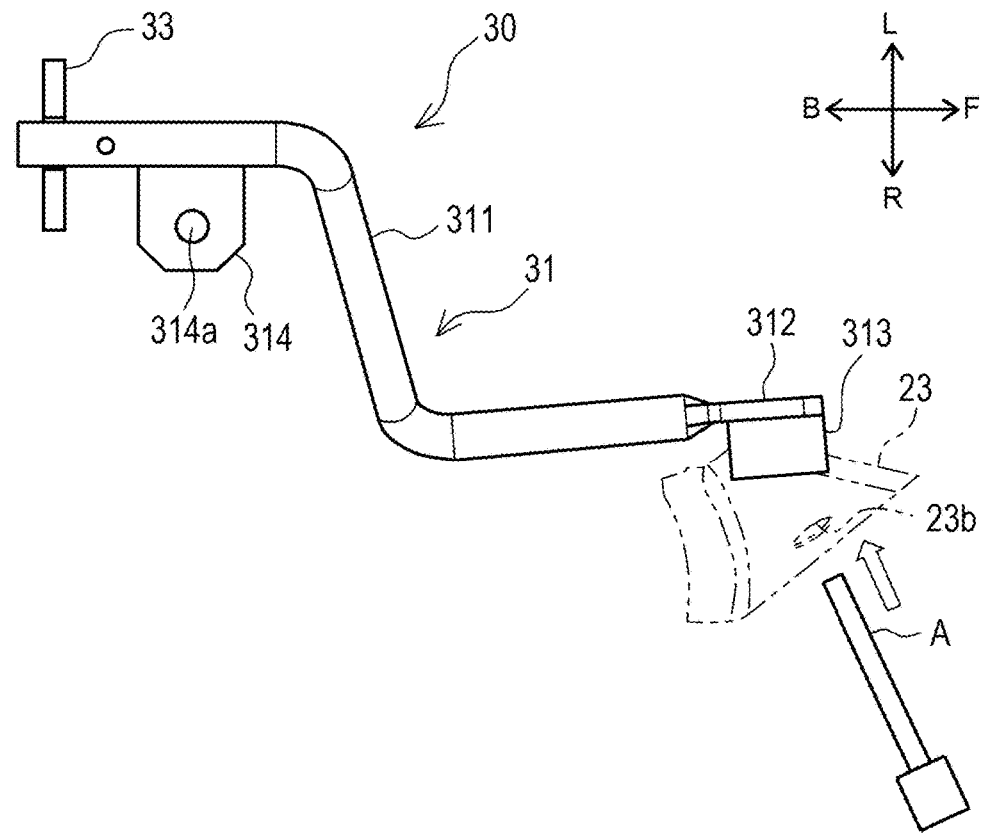
FIG. 16A is a plan view showing the lock mechanism before a moving member is pressed by an operating tool.

As shown in FIG. 16A, the user inserts the operating tool A into the through hole 23b of the bonnet 20. At this time, even if the insertion direction of the operating tool A varies, the operating tool A can be guided to the pressed portion 312 by an inner wall of the guide portion 313 so as to be able to press the pressed portion 312 of the moving member 31. Alternatively, the operating tool A may press an inner wall of the guide portion 313.

Figure 16B:
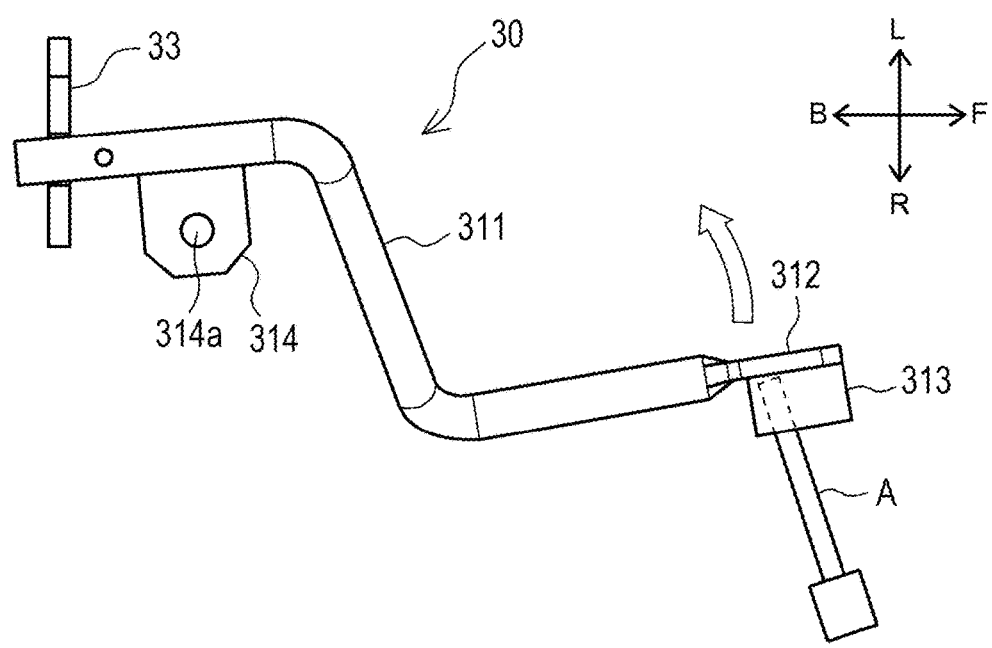
FIG. 16B is a plan view showing the lock mechanism when the moving member is pressed by the operating tool.

As shown in FIG. 16B, when the pressed portion 312 (or the guide portion 313) is pressed substantially to the left (rear left) by the operating tool A, the moving member 31 rotates counterclockwise in a plan view around the axis of the rocking shaft 314a.

Figure 17A:
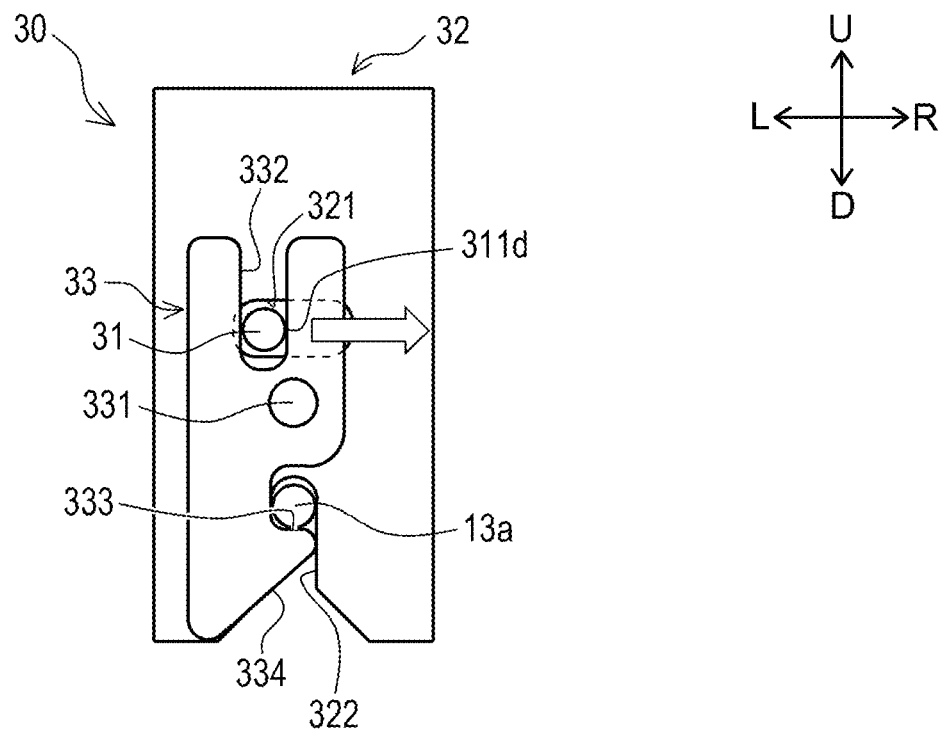
FIG. 17A is a rear view showing the lock mechanism when the bonnet is closed.

As shown in FIG. 17A, as the moving member 31 rotates, the contact portion 311d of the moving member 31 presses the second cut-away portion 332 of the lock member 33 to the right. As a result, the lock member 33 rotates clockwise in a rear view around the axis of the rocking shaft 331.

Figure 17B:
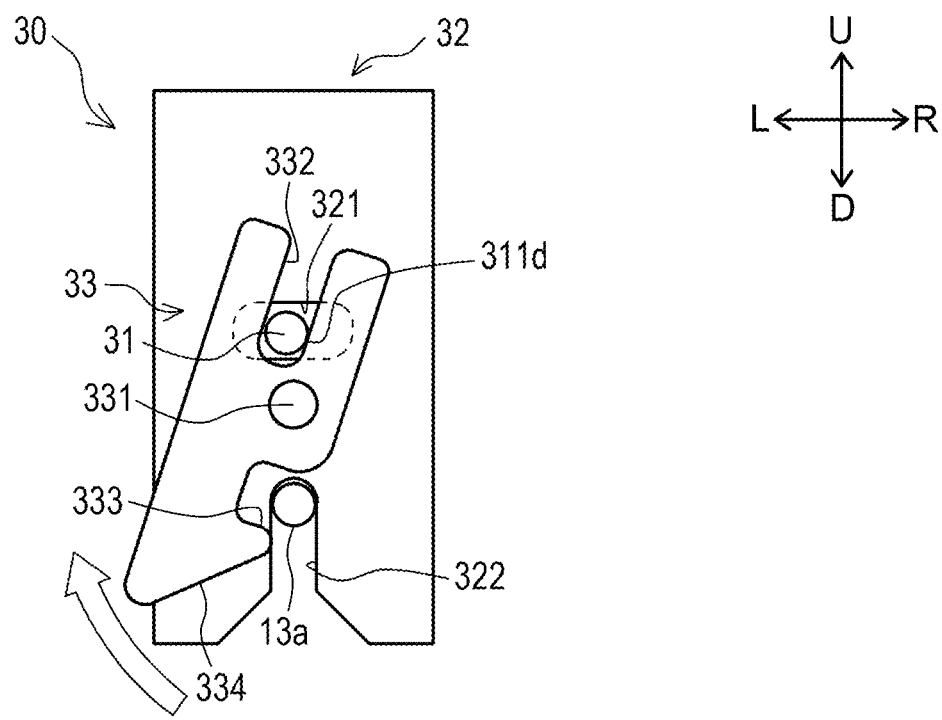
FIG. 17B is a rear view showing the lock mechanism when the bonnet is being opened (first stage).

As shown in FIG. 17B, when the lock member 33 further rotates clockwise in a rear view, the pin 13a is disengaged from the lower surface of the third cut-away portion 333 of the lock member 33. Then, the bonnet 20 rotates so that the front portion of the bonnet 20 moves upward due to the urging force of the urging member 25 (see FIG. 9 and the like). At this time, the bonnet 20 rotates (moves) while being guided by the pin 13a and the first cut-away portion 322 of the regulating portion 32.

Figure 18A:
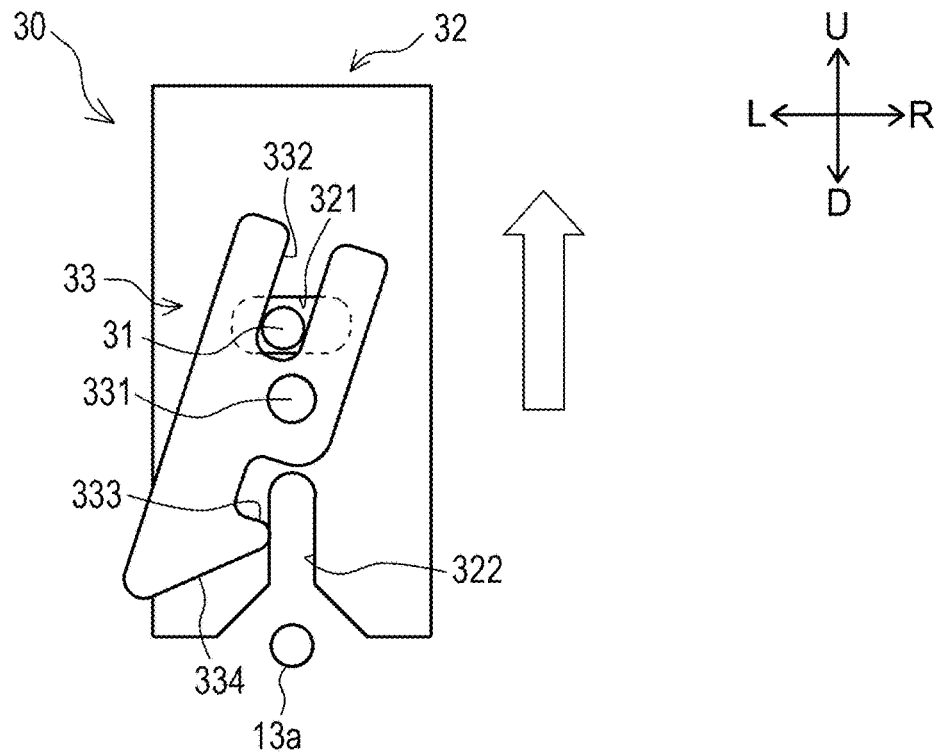
FIG. 18A is a rear view showing the lock mechanism when the bonnet is being opened (second stage).
Figure 18B:
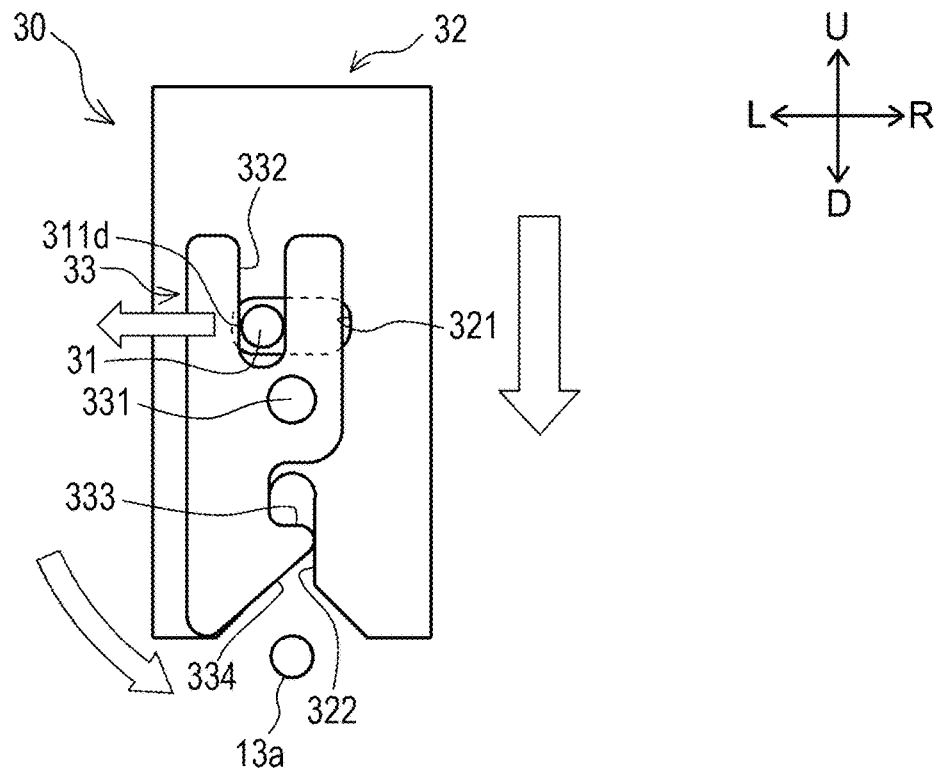
FIG. 18B is a rear view showing the lock mechanism when the bonnet is open.

As shown in FIG. 18A, when the bonnet 20 further rotates so that the front portion moves upward, the lock mechanism 30 moves upward and separates from the pin 13a.

When the user pulls the operating tool A out of the through hole 23b, pressing of the pressed portion 312 by the operating tool A is released. Then, the moving member 31 rotates clockwise in a plan view around the axis of the rocking shaft 314a due to the urging force of the urging member 34. As a result, the moving member 31 returns from the position shown in FIG. 16B to the position shown in FIG. 16A.

As shown in FIG. 18B, when the moving member 31 rotates clockwise in a plan view, the contact portion 311d of the moving member 31 presses the second cut-away portion 332 of the lock member 33 to the left. As a result, the lock member 33 rotates counterclockwise in a rear view, and returns to an original position (the position shown in FIG. 17A).

In this way, the pin 13a and the lock member 33 are disengaged, and the lock mechanism 30 is in an unlocked state in which the bonnet 20 is not locked. Therefore, the user can lift the front portion of the bonnet 20 by hand to open the bonnet 20 (the state shown by the alternate long and short dash lines in FIG. 15).

As described above, in the tractor 1 according to the present preferred embodiment, the lock mechanism 30 is switchable between a locked state (see FIG. 17A) in which the moving member 31 and the lock member 33 move (rock) to lock the bonnet 20 and an unlocked state (see FIG. 18B) in which the bonnet 20 is not locked. Since the lock mechanism 30 is provided on the bonnet side, when the bonnet 20 is opened, the lock mechanism 30 moves upward together with the bonnet 20. Therefore, when the bonnet 20 is opened for repair work around the engine, the lock mechanism 30 including a moving mechanism moves upward together with the bonnet 20, so that the inside of the engine room can be easily seen and a working space is secured. Therefore, workability of repair and the like can be improved.

Further, in the tractor 1 according to the present preferred embodiment, when the pressed portion 312 is pressed by the operating tool A in order to unlock the bonnet 20, the pressed portion 312 serves as a force point, the rocking shaft 314a serves as a fulcrum, and the contact portion 311d serves as an action point, and the moving member 31 and the lock member 33 move (rock) in conjunction with each other. The pressed portion 312, the rocking shaft 314a, and the contact portion 311d are provided so as to be substantially positioned in the front-rear direction (see FIG. 10). Therefore, the moving member 31 and the like can be disposed by effectively utilizing a limited space in the front portion of the bonnet 20. That is, the moving member 31 and the like can be disposed without widening the left and right width of the space in the bonnet 20.

Further, in a plan view (viewed from an axial direction of the rocking shaft 314a), the pressed portion 312, the rocking shaft 314a, and the contact portion 311d are positioned so that the linear distance between the center of the rocking shaft 314a and the contact portion 311d is shorter than the linear distance between the center of the rocking shaft 314a and the pressed portion 312 (see FIG. 10). Therefore, the user can rotate the moving member 31 and the lock member 33 simply by pressing the pressed portion 312 with a relatively small force using the operating tool A. In this way, the force required to operate the moving member 31 can be reduced, and thus the workability of unlocking can be improved.

As described above, the tractor 1 (work vehicle) according to the present preferred embodiment includes the openable and closable bonnet 20 that covers the engine 3 and is rockable with respect to the body frame 2, the pin 13a (engaged portion) that is provided on the body frame 2 side, and the lock mechanism 30 that is provided on the bonnet 20 side and is switchable between a locked state in which the bonnet 20 is locked by the lock mechanism 30 engaging with the pin 13a and an unlocked state in which the bonnet 20 is not locked by the lock mechanism 30 not engaging with the pin 13a.

With such a configuration, workability can be improved.

Specifically, since the lock mechanism 30 is provided on the bonnet 20 side, it is easy to see the inside of the engine room when the bonnet 20 is opened, and thus, the workability of repair around the engine 3 and the like can be improved.

Further, the lock mechanism 30 includes the moving member 31 that can move by being pressed by the operating tool A, and the lock member 33 that engages with the pin 13a, and is disengaged from the pin 13a as the moving member 31 moves.

With such a configuration, the lock mechanism 30 can have a simple configuration.

Further, the moving member 31 includes the pressed portion 312 pressed by the operating tool A, and the contact portion 311d that comes into contact with the lock member 33, and the moving member 31 rocks around the rocking shaft 314a by the pressed portion 312 being pressed by the operating tool A, and presses the lock member 33 by the contact portion 311d, and the lock member 33 is movable, and a distance between the rocking shaft 314a and the contact portion 311d is shorter than a distance between the rocking shaft 314a and the pressed portion 312 when viewed from an axial direction of the rocking shaft 314a.

With such a configuration, the force required to operate the moving member 31 can be reduced, and thus the workability of unlocking can be improved.

Further, the pressed portion 312, the rocking shaft 314a, and the contact portion 311d are provided so as to be positioned substantially in the front-rear direction.

With such a configuration, the moving member 31 can be disposed by effectively utilizing the limited space in the bonnet 20. That is, the moving member 31 can be disposed without widening the left and right width of the space in the bonnet 20.

Further, the lock mechanism 30 is provided in the front portion of the bonnet 20, and the moving member 31 is provided forward of the lock member 33.

With such a configuration, by consolidating the lock mechanism 30 in the front portion of the bonnet 20, it is possible to prevent the moving member 31 and other members inside the bonnet 20 from interfering with each other.

Further, the moving member 31 is bent so as not to interfere with the second member 24b (frame) provided on the inner surface of the bonnet 20.

With such a configuration, the moving member 31 can be disposed without expanding a space for disposing the moving member 31.

Further, the moving member 31 includes the guide portion 313 that guides the operating tool A to press the moving member 31.

With such a configuration, the moving member 31 is easily pressed by the operating tool A, and thus the workability of unlocking can be improved.

Further, the bonnet 20 includes the through hole 23b that is visible from the front of the vehicle body and into which the operating tool A can be inserted.

With such a configuration, the through hole 23b into which the operating tool A is inserted can be easily visually recognized.

Further, the lock mechanism 30 is disposed between the left and right headlights 23a.

With such a configuration, the lock mechanism 30 can be disposed by effectively utilizing the space between the left and right headlights 23a.

The tractor 1 according to the present preferred embodiment is a preferred embodiment of the work vehicle according to the present disclosure.

Further, the pin 13a according to the present preferred embodiment is a preferred embodiment of the engaged portion according to the present disclosure.

Further, the second member 24b according to the present preferred embodiment is a preferred embodiment of the frame according to the present disclosure.

Although one preferred embodiment of the present disclosure has been described above, the present disclosure is not limited to the above configuration, and various modifications can be made within the scope of the present disclosure described in the claims.

For example, the work vehicle according to the present preferred embodiment is the tractor 1, but the type of the work vehicle according to the present disclosure is not limited to this. The work vehicle according to the present disclosure may be another agricultural vehicle, construction vehicle, industrial vehicle, or the like.

Further, in the present preferred embodiment, the tractor 1 is a ROPS (Roll-Over Protective Structure) machine provided with a ROPS frame, but may be a cabin machine provided with a cabin.

Further, in the present preferred embodiment, the rear wheels 7 are wheels (tires), but a crawler type traveling device may be adopted instead of the rear wheels 7.

Further, in the present preferred embodiment, the bonnet 20 preferably is a front opening type in which the front portion rocks up and down, but may be a rear opening type in which the rear portion rocks up and down. In this case, the lock mechanism 30 can be provided at the rear of the bonnet 20.

Further, in the present preferred embodiment, the operating tool A is inserted into the bonnet 20 from the front side of the bonnet 20 to unlock the bonnet 20, but the location and the direction in which the operating tool A is inserted are not limited to this. For example, the operating tool A may be inserted into the bonnet 20 from above the bonnet 20 to unlock the bonnet 20.

Further, in the present preferred embodiment, the lock mechanism 30 is structured so that a major portion of the lock mechanism 30 is located in the space between the left and right headlights 23a. However, "the lock mechanism 30 is disposed between the left and right headlights 23a" in the present disclosure includes a case where at least a portion of the lock mechanism 30 is located in the space.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   an openable and closable bonnet that covers an engine and is rockable with respect to a body frame;
   an engaged portion that is provided on a body frame side; and
   a lock that is provided on a bonnet side and is switchable between a locked state in which the bonnet is locked by the lock engaging with the engaged portion and an unlocked state in which the bonnet is not locked by the lock not engaging with the engaged portion; wherein
   the lock includes:
     a moving member that can move by being pressed by an operating tool; and
     a lock portion that engages with the engaged portion, and is disengaged from the engaged portion as the moving member moves; and
   the moving member includes:
     a pressed portion to be pressed by the operating tool when inserted into a through hole of the bonnet; and
     a guide portion having a cylindrical shape to guide the operating tool to the pressed portion by an inner wall of the cylindrical shape, and the guide portion is movable together with the pressed portion.

2. The work vehicle according to claim 1, wherein the moving member includes:
   a contact portion that comes into contact with the lock portion; wherein
   the moving member rocks around a rocking shaft by the pressed portion being pressed by the operating tool, and presses the lock portion by the contact portion, and the lock portion is movable; and
   a distance between the rocking shaft and the contact portion is shorter than a distance between the rocking shaft and the pressed portion when viewed from an axial direction of the rocking shaft.

3. The work vehicle according to claim 2, wherein the pressed portion, the rocking shaft, and the contact portion are positioned substantially in a front-rear direction.

4. The work vehicle according to claim 3, wherein
   the lock is in a front portion of the bonnet; and
   the moving member is forward of the lock portion.

5. The work vehicle according to claim 4, wherein the moving member is bent so as not to interfere with a frame provided on an inner surface of the bonnet.

6. The work vehicle according to claim 3, wherein the moving member is bent so as not to interfere with a frame provided on an inner surface of the bonnet.

7. The work vehicle according to claim 2, wherein the moving member is bent so as not to interfere with a frame provided on an inner surface of the bonnet.

8. The work vehicle according to claim 2, wherein the through hole is visible from a front of a vehicle body.

9. The work vehicle according to claim 1, wherein the moving member is bent so as not to interfere with a frame provided on an inner surface of the bonnet.

10. The work vehicle according to claim 1, wherein the lock is disposed between left and right headlights.

* * * * *